US009910210B2

(12) United States Patent
Niu

(10) Patent No.: US 9,910,210 B2
(45) Date of Patent: Mar. 6, 2018

(54) ELECTRONIC DEVICE HAVING TRANSPARENT DISPLAY FUNCTION AND DISPLAY DEVICE THEREOF

(71) Applicant: AU OPTRONICS CORPORATION, Hsin-Chu (TW)

(72) Inventor: Tzu-Ling Niu, Hsin-Chu (TW)

(73) Assignee: AU OPTRONICS CORPORATION, Hsin-Chu (TW)

(*) Notice: Subject to any disclaimer, the term of this patent is extended or adjusted under 35 U.S.C. 154(b) by 240 days.

(21) Appl. No.: 14/696,558

(22) Filed: Apr. 27, 2015

(65) Prior Publication Data
US 2015/0346420 A1 Dec. 3, 2015

(30) Foreign Application Priority Data

May 29, 2014 (TW) .............................. 103118771 A

(51) Int. Cl.
A63F 13/00 (2014.01)
F21V 8/00 (2006.01)
(Continued)

(52) U.S. Cl.
CPC ......... G02B 6/0053 (2013.01); G02B 6/0066 (2013.01); G02B 6/0083 (2013.01);
(Continued)

(58) Field of Classification Search
CPC .. G02B 6/0053; G02B 6/0055; G02B 6/0066; G02B 6/0068; G02F 1/133606; G02F 2001/133607
(Continued)

(56) References Cited

U.S. PATENT DOCUMENTS 8,203,659 B2 6/2012 Chou
2007/0147069 A1* 6/2007 Zhu ...................... G02B 6/0055
362/600
(Continued)

FOREIGN PATENT DOCUMENTS

CN 101778655 A 7/2010
JP 2009142383 7/2009
(Continued)

OTHER PUBLICATIONS

Office Action issued in corresponding China patent application dated Jan. 3, 2017.

Primary Examiner — Elmito Breval
Assistant Examiner — Keith Delahoussaye
(74) Attorney, Agent, or Firm — McClure, Qualey & Rodack, LLP

(57) ABSTRACT

An electronic device and a display device are provided. The electronic device includes the display device and an object to be shown. The display device includes a display panel, a first backlight module, and a second backlight module. The display panel has a transparent area corresponding to the object. The first backlight module is disposed with a gap to the display panel and generates first backlight to reach the display panel. The second backlight module has a prism sheet and a collimated illumination. The prism sheet is parallel to the display panel and corresponding to the transparent area, while the collimated illumination generates light reaching the prism sheet. The light is orientated by the prism sheet and becomes a second backlight before entering the transparent area.

5 Claims, 11 Drawing Sheets

(51) Int. Cl.
*G06T 1/20* (2006.01)
*G09G 5/10* (2006.01)
*G09G 3/34* (2006.01)

(52) U.S. Cl.
CPC ............... *G06T 1/20* (2013.01); *G09G 3/344* (2013.01); *G09G 3/3406* (2013.01); *G09G 5/10* (2013.01); *G09G 2300/0426* (2013.01)

(58) Field of Classification Search
USPC .................................................. 362/606–608
See application file for complete search history.

(56) References Cited

U.S. PATENT DOCUMENTS

| | | |
|---|---|---|
| 2010/0144432 A1 | 6/2010 | Nittou |
| 2010/0245717 A1* | 9/2010 | Miyamoto ........... G02B 6/0051 349/65 |
| 2011/0277361 A1* | 11/2011 | Nichol ................ G02B 6/0018 40/541 |
| 2012/0105765 A1* | 5/2012 | Kawai ............... G02F 1/133605 349/62 |
| 2012/0206321 A1 | 8/2012 | Lee et al. |
| 2014/0160383 A1* | 6/2014 | Shikii ................... G02B 5/045 349/15 |

FOREIGN PATENT DOCUMENTS

| | | |
|---|---|---|
| JP | 2009-261575 | 11/2009 |
| JP | 2010286813 A | 12/2010 |

\* cited by examiner

ELECTRONIC DEVICE HAVING TRANSPARENT DISPLAY FUNCTION AND DISPLAY DEVICE THEREOF

BACKGROUND

1. Technical Field

The present disclosure generally relates to an electronic device and display device thereof; particularly, the present disclosure relates to an electronic device having transparent display function and display device thereof.

2. Description of the Related Art

In recent years, flat panel display devices have been widely used in various fields. They may be used independently as displays, or may also be embedded in electronic devices to display information. There are various different types of flat panel display devices, such as organic light-emitting diode (OLED) displays, liquid crystal displays (LEDs), electrophoretic displays, wherein liquid crystal displays are currently the most common flat panel display devices.

In terms of conventional liquid crystal display devices, conventional liquid crystal display devices can only merely display images and are not able to provide transparent viewing through the display device such that background objects may be seen. However, recent developing direction of displays has seen displays being made with transparent capabilities in order to meet specific user requirements. As seen in FIG. 1, FIG. 1 is a top view of a conventional display device having a transparent area. The current liquid crystal display device 1 with transparent capabilities can have a transparent area 11 in its display area 10. In other words, transparent area 11 can not only display images normally, it may also be switched to transparent mode to allow users to see object 8 through the transparent area 11.

In order to display images or information in the display area 10, a backlight source 3 must be provided behind the display area 10, wherein the liquid crystal layer then controls the passage level of the backlight to generate the images or information. However, the backlight source 3 typically cannot be disposed blocking the object 8, and is forced to be disposed avoiding the object 8. For instance, corresponding to the positions of the object 8 and the transparent area 11 on the light-guide plate 31 of the backlight source 3, holes may be formed. However, in this particular design, when the display area 10 and its transparent area 11 need to entirely display images, the transparent areas 11 will have lower backlight levels due to the avoidance of the backlight source 3 and ultimately result in poorer image quality due to the obvious contrasts in brightness.

SUMMARY

It is an object of the present disclosure to provide an electronic device and display device thereof to transparently display and view objects through the display device.

It is another object of the present disclosure to provide an electronic device and display device thereof to enable the transparent area of the display device to have increased brightness when displaying images.

It is yet another object of the present disclosure to provide an electronic device and display device thereof to increase the brightness levels of objects displayed through the transparency in the device.

In one aspect of the present disclosure, the display device includes a light modulation panel, a first backlight module, and a second backlight module. The light modulation panel has a backside and a transparent area. The first backlight module is disposed corresponding to the backside with a gap and generates a first backlight entering into the light modulation panel from the backside. The second backlight module includes a prism sheet and a collimated backlight source. The prism sheet is disposed parallel to the backside and corresponds to the transparent area. The collimated backlight source is disposed between the light modulation panel and the first backlight module, wherein two ends of the collimated backlight source respectively extend toward the prism sheet and the first backlight module. The collimated backlight source generates light emitting at an incline to the prism sheet, and the prism sheet deflects the light to form a second backlight entering the transparent area.

In another aspect of the present disclosure, the display device includes a light modulation panel, a first backlight module, and a second backlight module. The first backlight module has a backside and includes a transparent area. The first backlight module is disposed with a gap to the backside, and generates a first backlight entering the light modulation panel from the backside, wherein the first backlight can form flat surface light. The second backlight module includes a prism sheet and a collimated backlight source. The prism sheet is disposed parallel to the backside and corresponds to the transparent area. The collimated backlight source is disposed between the prism sheet and the first backlight module, wherein the collimated backlight source can form flat surface light. A light-emitting surface of the first backlight module is substantially orthogonal to a first light-emitting surface of the collimated backlight source.

In another aspect of the present disclosure, the electronic device includes a light modulation panel, a first backlight module, a displayed object, and a second backlight module. The light modulation panel has a backside and a transparent area. The first backlight module is disposed with a gap to the backside, and generates a first backlight entering the light modulation panel from the backside. The displayed object is disposed between the transparent area and the first backlight module. The second backlight module includes a prism sheet and a collimated backlight source. The prism sheet is disposed on the backside and corresponds to the transparent area, wherein the prism sheet is sandwiched between the transparent area and the displayed object. The collimated backlight source is disposed on a side of the displayed object, and two ends of the collimated backlight source respectively extend toward the prism sheet and the first backlight module. The collimated backlight source generates light entering inclined into the light-entrance surface to form a second backlight that enters the transparent area after being deflected and light-guided by the prism sheet.

DETAILED DESCRIPTION OF THE PREFERRED EMBODIMENT

The present disclosure provides an electronic device and a display device used therein. In an embodiment, the electronic device may include gaming machines, automatic vending machines, transparent devices, and other related large electronic devices, wherein the display device included therein has portions that may be selectively transparent. However, in other different embodiments, the electronic device may also be lighter and more mobile devices such as handheld or vehicle-mounted electronic devices. The requirement is that the display device in the electronic device must still have capabilities of being able to selectively make some portions transparent.

Figure 1:
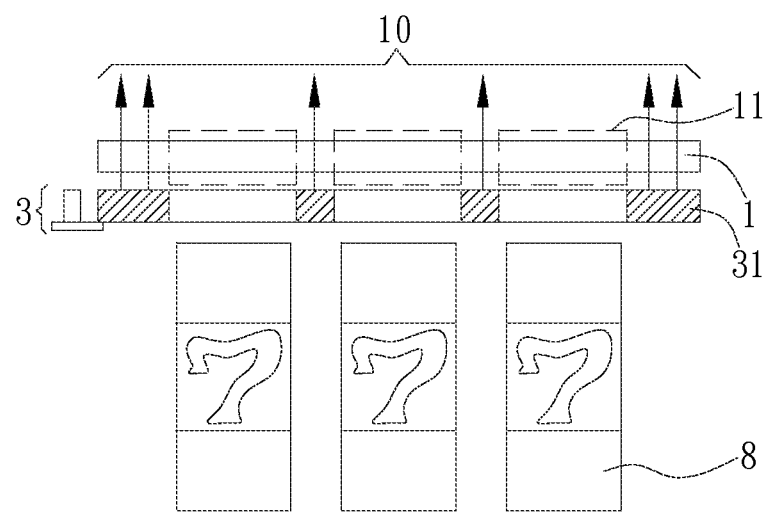
FIG. 1 is a view of a conventional display device with transparent areas.
Figure 2A:
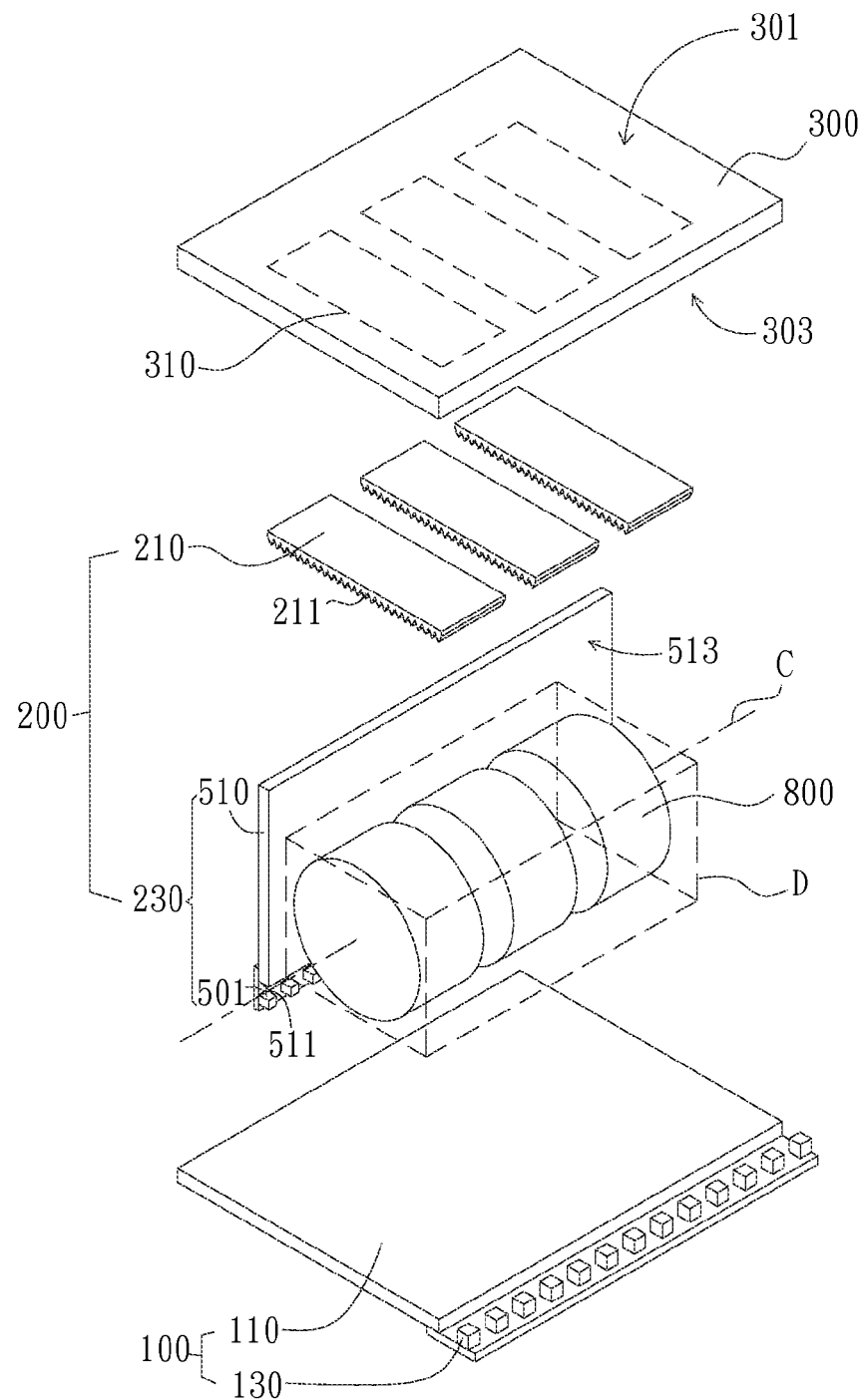
FIG. 2A is an exploded view of an embodiment of the electronic device and display device.
Figure 2B:
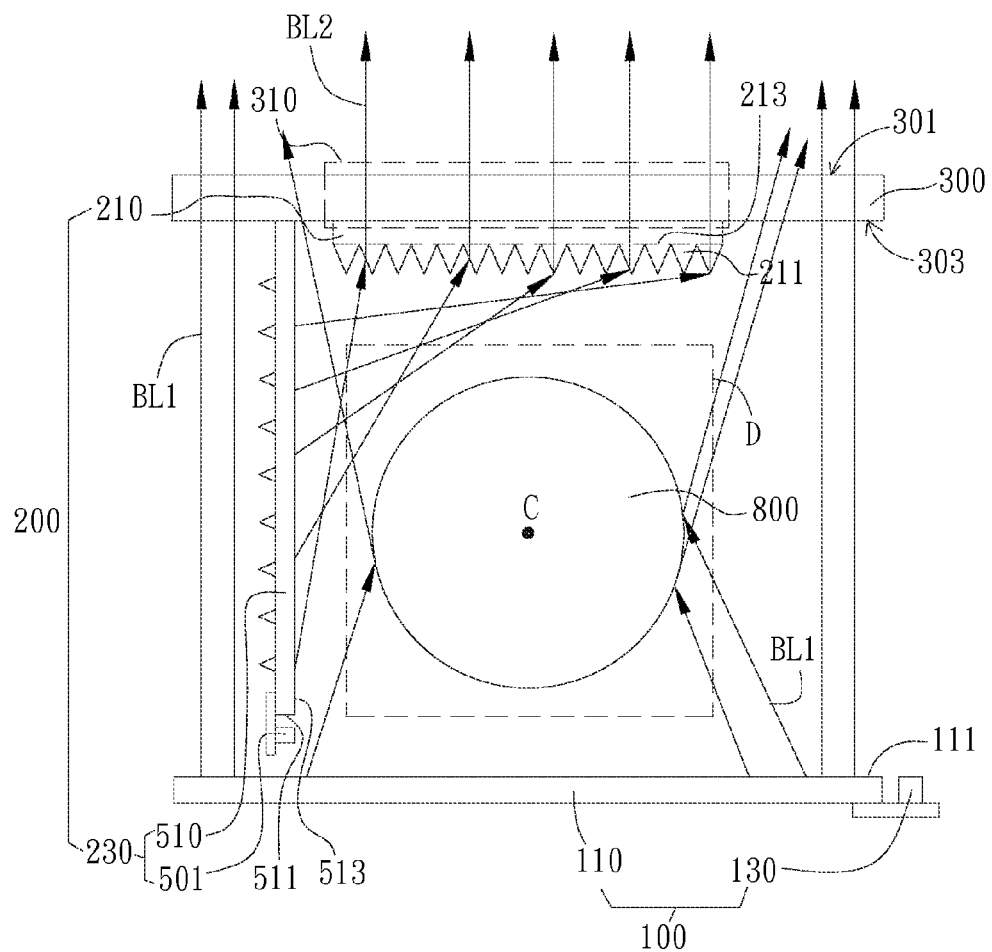
FIG. 2B is a cross-sectional view of an embodiment of the electronic device and display device.

As shown in FIG. 2A, the electronic device includes a light modulation panel 300, a first backlight module 100, a second backlight module 200, and a displayed object 800, wherein the light modulation panel 300, the first backlight module 100, and the second backlight module 200 collectively form the display device of the present embodiment. In the present embodiment, the electronic device is a gaming machine, such as a slot machine, wherein the displayed object 800 is a cylindrical shaped roller for displaying winning numbers. However, in other different embodiments, the electronic device is an automatic vending machine, wherein the displayed object 800 is the pending merchandise for sale. The light modulation panel 300 is preferably a liquid-crystal display panel provided to adjust amount of backlight passing through to generate display images. However, the present disclosure is not limited to these embodiments. The light modulation panel 300 may also be an electrophoretic display panel, a flexible display panel, or any other related display panels. As shown in FIGS. 2A and 2B, the light modulation panel 300 has a display side 301 and a backside 303, wherein the display side 301 is a side for users to view the images of the electronic device, and the backside 303 is a side opposite to the display side 301. The light modulation panel 300 includes a transparent area 310, wherein the transparent area 310 corresponds to the displayed object 800. That is, the transparent area 310 is at least the area of the light modulation panel 300 that encompasses the projection of the displayed object 800 onto the light modulation panel 300. In other words, the transparent area 310 is related in size, shape, dimension, and/or position to the displayed object 800 such that the displayed object 800 may be seen through the transparent area 310. For instance, in referring to FIG. 2A, the displayed object 800 has three distinct rollers or cylindrical shapes. The transparent area 310 is disposed above the displayed object 800, and matches the number and shapes of the three rollers when viewed from above. In this manner, when viewed through the transparent area 310, all three rollers of the displayed object 800 can be correspondingly seen. The display device can switch to a transparent mode or a display mode. When the display device is set to the transparent mode, users can see the displayed object 800 through the transparent area 310 from the display side 301. However, when in the display mode, the transparent area 310 can still display images. In the present embodiment, the transparent area 310 only occupies a portion of the viewable area of the light modulation panel 300, whereas the other portions are designed to be non-transparent and are primarily provided to display images.

The first backlight module 100 is disposed with a gap to the backside 303 of the light modulation panel 300, wherein within this gap, a rectangular shaped area D is formed from the overlapping of the projection areas of the first backlight module 100 and the light modulation panel 300. In the present embodiment, the first backlight module 100 is a surface light source, and the first backlight module 100 generates a first backlight BL1 to enter the light modulation panel 300 from the backside 303. The first backlight module 100 is a planar source formed from side-lit (side entry) type of light source. However, the present disclosure is not restricted to this embodiment. For instance, the first light modulation panel 300 may also be a surface light source formed from a direct type of light source.

FIG. 2B illustrates a cross-sectional view along the plane orthogonal to the axis C of the embodiment shown in FIG. 2A. As shown in FIG. 2B, the first backlight module 100 is formed from the light-guide plate 110 and the side light source 130, wherein the light-guide plate 110 is parallel to the light modulation panel 300, and the side light source 130 is disposed on a side of the light-guide plate 110. In the present embodiment, the side light source 130 is formed from a plurality of light-emitting diodes and are distributed extending along the side of the light-guide plate 110. The side light source 130 generates light, and the light travels into the light-guide plate 110. The first backlight BL1 emitted from the light-guide plate 110 travels toward the light-emitting surface 111 of the light modulation panel 300. The first backlight BL1 passes through the rectangular area D and arrives at the backside 303 of the light modulation panel 300. In the present embodiment, the light will be emitted out of the surface of the light-guide plate 110 at a light-emitting angle of 70~80 degrees. Then, the light is guided by the diffusion sheet and prism sheet (not shown) to be aligned with the user's line of sight. As shown in FIG. 2B, portions of the first backlight BL1 arrive at the displayed object 800 due to reflection, refraction, or scattering of the light thereof. Therefore, the first backlight module 100 has an effect of lighting the displayed object 800. In addition, portions of the light of the first backlight module 100 will pass through non-roller areas and it results that light passes through the light modulation panel 300 for displaying.

Figure 3:
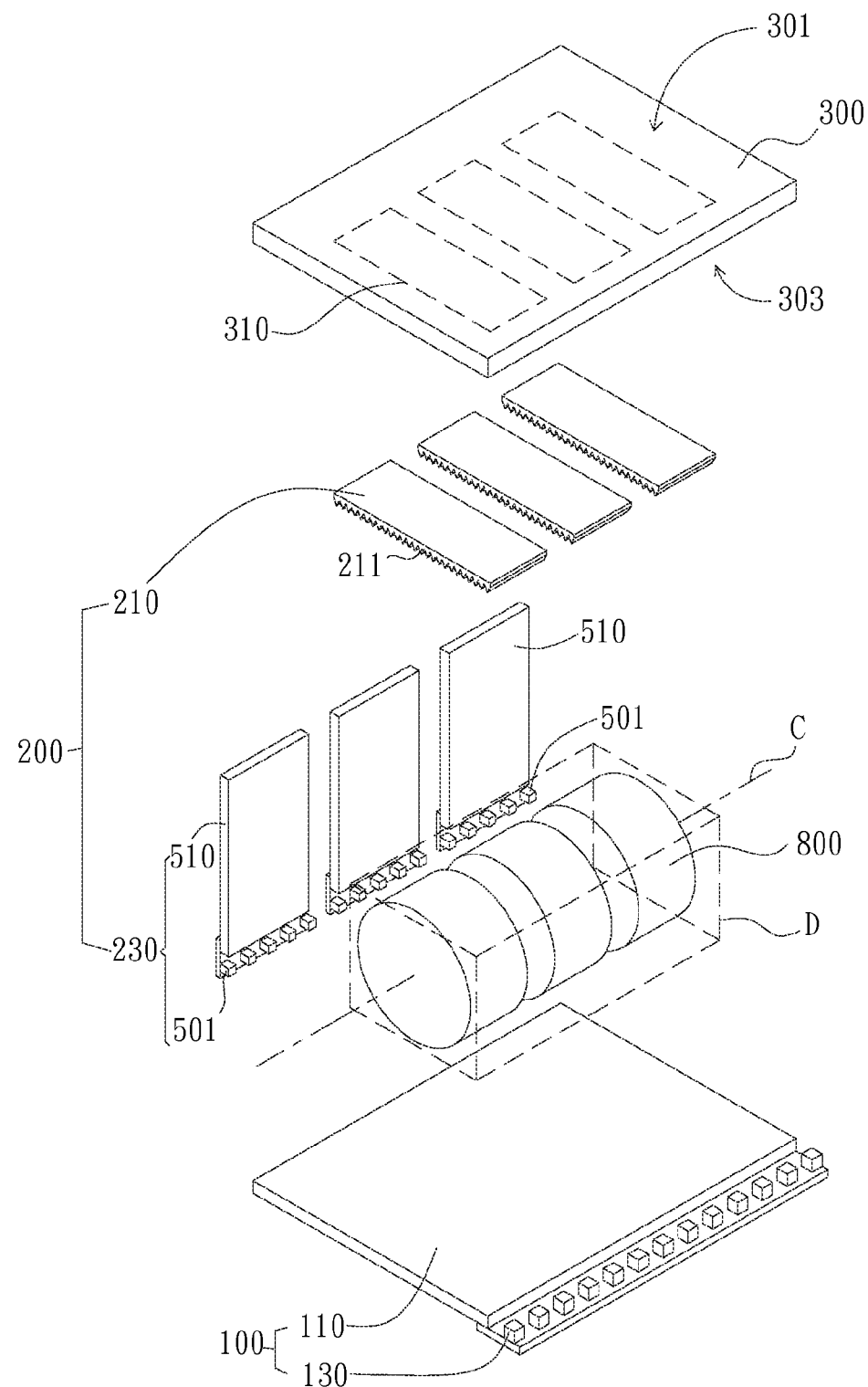
FIG. 3 is an exploded view of another embodiment of the electronic device and display device.
Figure 4A:
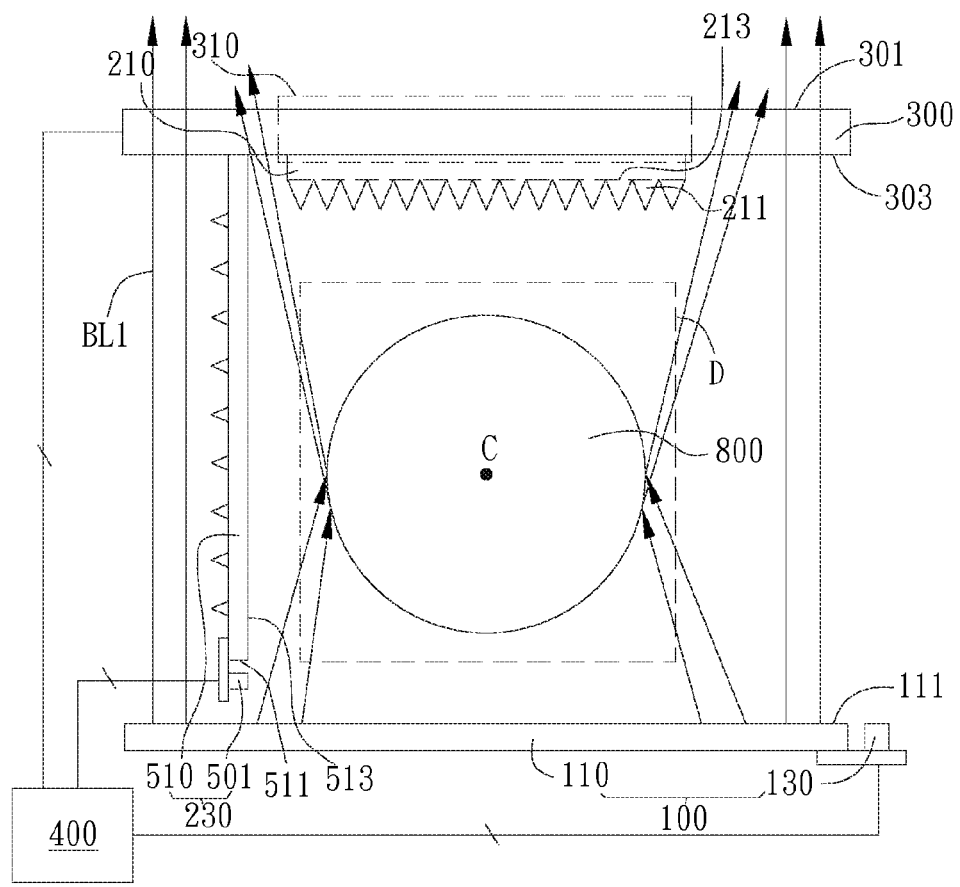
FIGS. 4A and 4B illustrate the light path during transparent mode.

The second backlight module 200 includes prism sheet 210 and collimated backlight source 230. As shown in FIGS. 3 and 4A, the prism sheet 210 is disposed parallel to the backside 303 and corresponds to the transparent area 310. That is, the prism sheet 210 is disposed on the backside 303 such that the projection of the prism sheet 210 onto the light modulation panel 300 overlaps with the transparent area 310. In the present embodiment, the prism sheet 210 is adhered onto the transparent area 310 of the backside 303 and sandwiched between the transparent area 310 and the displayed object 800. In more definite terms, the prism sheet 210 includes a plurality of prisms 211 protruding on a light-entrance surface 213 facing away from the light modulation panel 300. In other words, the vertex of the prism 211 faces the first backlight module 100. The structure of the prism 211 is designed symmetrically or non-symmetrically. When prisms 211 covers entirely on the light-entrance surface 213, the light-entrance surface 213 can be regarded as the virtual flat surface formed by the bottom ends of the prisms 211. In addition, in other different embodiments, the prisms 211 are disposed on a surface of the prism sheet 210 facing the light modulation panel 300.

The collimated backlight source 230 is disposed between the light modulation panel 300 and the first backlight module 100. And the normal direction of the collimated backlight source 230 is perpendicular to the normal direction of the light modulation panel 300. In details, the collimated backlight source means that the backlight is emitted with high luminous intensity within a particular angle range especially in the normal direction. The lighting characters and light source construction of the light from the collimated backlight source 230 are different from the light from the first backlight module 100 formed from the light-guide plate 110 and the side light source 130. In the present embodiment, the light-emittance angle (viewing angle of light emitted) of the collimated backlight source 230 is smaller or equal to +/−20 degrees, wherein light efficiency is higher when the collimated backlight source 230 is used in this range. However, the present disclosure is not restricted to this light-emittance angle. The second backlight source also utilizes non-collimated backlight sources, such as having a light-emittance angle of +/−45 degrees. Although light efficiency would be relatively lower, the effect of supplementary lighting can still be achieved. The two ends of the collimated backlight source 230 respectively extend toward the prism sheet 210 and the first backlight module 100. As illustrated in FIG. 3, the collimated backlight source 230 includes a first light-guide plate 510 and a first light source 501. The first light-guide plate 510 is disposed between the light modulation panel 300 and the first backlight module 100, and has a first light-entrance end 511 and a first light-emitting surface 513. The first light-emitting surface 513 is the surface of the first light-guide plate 510 that faces the columnar space D and the displayed object 800 accommodated therein. The first light-entrance end 511 is positioned at an end of the first light-emitting surface 513 away from the prism sheet 210. The first light-emitting surface 513 is orthogonal to the light-emitting surface 111 of the first backlight module 100. The first light source 501 is disposed corresponding to the first light-entrance end 511, and generates light entering the first light-guide plate 510 from the first light-entrance end 511, wherein the light is then emitted inclined at an angle out of the first light-emitting surface 513 in a planar light-emitting form (preferably as a surface light form) before arriving at the light-entrance surface 213 of the prism sheet 210. The light is refracted and guided by the prism sheet 210 to form the second backlight BL2, and then enters the transparent area 310. When the transparent area 310 needs to display inputted images, the second backlight BL2 can be the supplementary light to the first backlight BL1, which is being blocked by the displayed object 800. In this manner, the loss of light of the first backlight BL1 due to being blocked by the displayed object 800 is supplemented by the second backlight BL2. As a result, the image displayed would remain more uniform. For instance, when light-emitting diodes are utilized in the first backlight module 100 and the second backlight module 200, different brightness levels may be achieved through modulating the electrical current of each light-emitting diode, wherein the brightness levels and supplementary brightness levels may then be modulated for different areas to help maintain light uniformity of the display image.

As shown in FIGS. 2A and 2B, in the present embodiment, the displayed object 800 is a cylindrical shape having an axis C. The prisms 211 on the prism sheet 210 trends parallel to the axis C. In other words, the direction of extension of the prism lines (the line of extension of the vertices of the prisms 211) of the prisms 211 are parallel to the axis C, wherein the collimated backlight source 230 is disposed on a side of the axis C (and not at the two ends of the axis C). However, the present disclosure is not restricted to this. In more definite terms, the extending direction of the prism lines of the prisms 211 is substantially parallel to the light-emitting surface of the second backlight module 200 (light-emitting surface of the prism sheet 210 and/or light-emitting surface of the collimated backlight source 230) such that light from the second backlight module 200 can pass through the inclined surface of the prisms 211 and be guided towards the light modulation panel 300 to achieve alignment of the light with the user's line of sight. In the present embodiment, the light-emitting surface of the first backlight module 100 faces the light modulation panel 300, wherein the light-emitting surface of the collimated backlight source 230 faces toward the circular surface of the displayed object 800. Therefore, the light-emitting surface of the first backlight module 100 is orthogonal to the collimated backlight source 230. The displayed object 800 facing the collimated light source 230 is a curved surface, and it results the light generated by the collimated light source 230 will not be blocked as easily by the displayed object 800 and will more easily be able to arrive at the prism sheet 210. Moreover, on the basis of controlling the distance between the collimated backlight source 230 and the displayed object 800, the brightness level of the displayed object 800 is modulated to meet the requirements of the resolution and the brightness of the displayed object 800 in view of the users. At the same time, the visibility levels of the displayed object 800 are also adjusted by controlling the brightness levels of the light emitted by the collimated light source 230.

FIG. 3 illustrates another embodiment of the electronic device and display device. In the present embodiment, the collimated light source 230 can be separated into several independent portions that respectively correspond to independent displayed objects 800. As shown in FIG. 3, the displayed objects 800 are three independent rollers. The collimated light source 230 can also be separated into three portions, wherein each portion individually includes first light-guide plates 510 and first light sources 501. Each portion of the collimated light source 230 can be modulated independently such that different brightness levels can be performed on each roller. In this manner, the effect of localized dimming can be achieved.

Figure 4B:
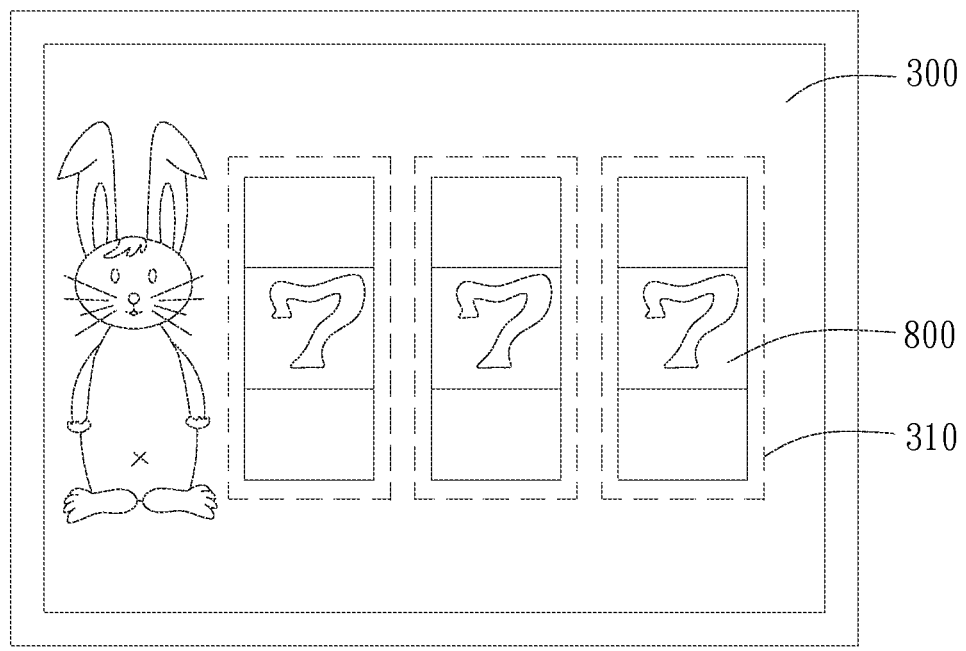

As shown in FIGS. 4A to 4D, the display device includes a control module 400, wherein the control module 400 can be electrically connected to the first backlight module 100 and the second backlight module 200. The control module 400 can switch the display device between a transparent mode and a display mode. In terms of a gaming console as an embodiment, when in the transparent mode, the transparent area 310 of the light modulation panel 300 is set to transparent in order to displaying the winning numbers represented on the rollers. In the end of the game, the gaming console is then set to display mode in order to display the game results and other related images. In the display mode, the image can be shown on the whole area of the light modulation panel 300 for image displaying purposes. As shown in FIGS. 4A and 4B, when the display device is set to the transparent mode, the control module 400 only lights up the first backlight module 100 and turns off the second backlight module 200. The first backlight BL1 emitted from the first backlight module 100 arrives at the light modulation panel 300. The image can be shown in the areas other than the transparent areas 310. In this instance, portions of pixels corresponding to the transparent area 310 on the light modulation panel 300 are controlled to allow light to pass through (in other words, being transparent) in order to displaying the displayed object 800. In addition, portions of the first backlight BL1 generate lighting effect and light up the displayed object 800 due to greater emitting angles or due to reflection or refraction shining onto the displayed object 800. In this manner, the displayed object 800 becomes brighter and clearer in visibility when being viewed from outside the transparent area 310. As shown in FIG. 4B, when the display device is in the transparent mode, the displayed object 800 is viewed in the transparent area 310 and images or information are displayed in other areas which are outside of the transparent area 310, such as the rabbit image of FIG. 4B. In an embodiment, the surface of the displayed object 800 is coated, painted, or in any other related methods with reflective material. The displayed object 800 is also selectively manufactured from materials with greater reflectivity properties. In the present embodiment of the rollers as an example, the rollers representing the displayed objects 800 are coated with reflective materials. In a usual way, the primary areas, that are to be displayed or emphasized, are the curved surfaces of the rollers. Therefore, light reflective materials are coated on the curved surface of the rollers. When portions of the first backlight BL1 shines on the curved surface of the displayed object 800, the letters or images on the curved surface can be brighter and clearer in visibility.

Figure 4C:
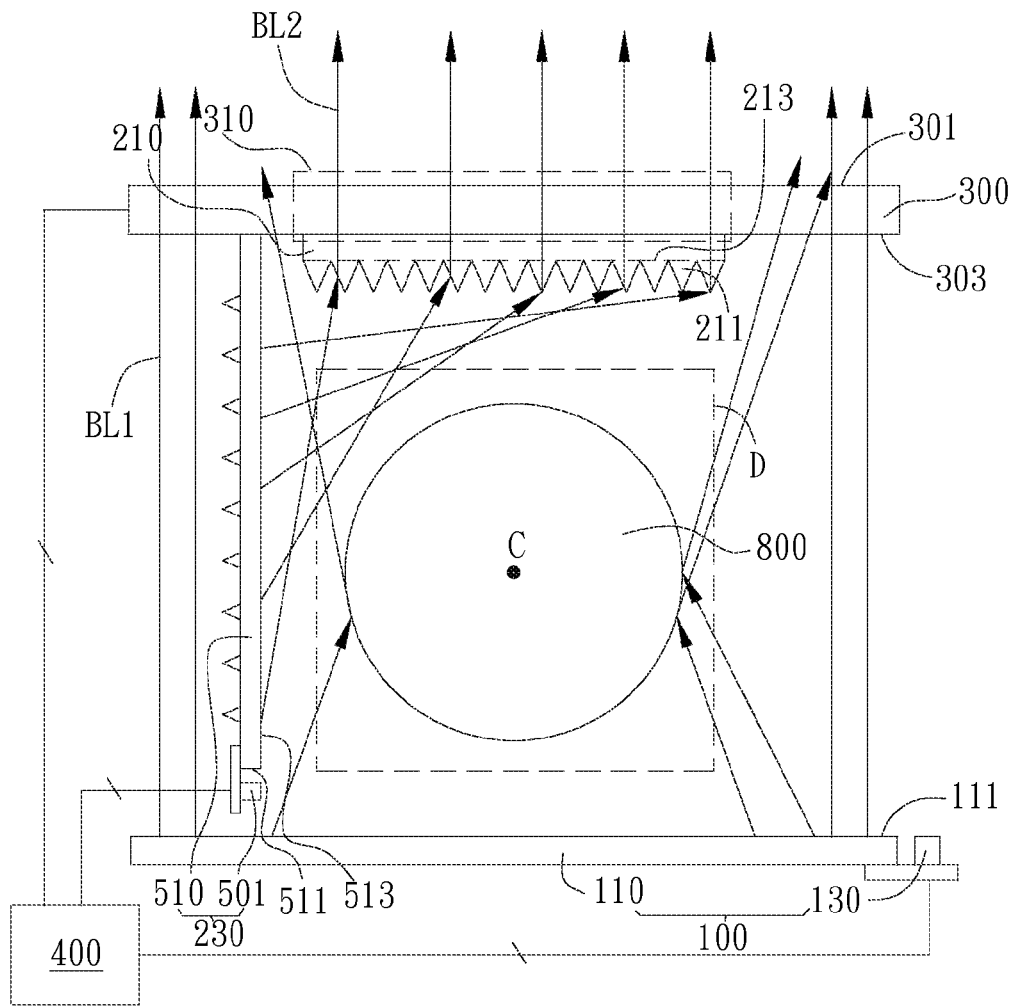
FIGS. 4C and 4D illustrate the light path during display mode.
Figure 4D:

As shown in FIGS. 4C and 4D, when the display device is in the display mode, the control module 400 simultaneously lights up the first backlight module 100 and the second backlight module 200. The first backlight BL1 emitted from the first backlight module 100 arrives at the light modulation panel 300 to display images in the areas other than the transparent area 310. The light generated from the collimated light source 230 is light-guided by the prism sheet 210 to form the second backlight BL2, wherein the second backlight BL2 then enters the transparent area 310 to complement the brightness levels of the transparent areas 310. In this instance, according to received image signals, the light modulation panel 310 controls the transparency levels of the pixels corresponding to the transparent area 310. It causes to generate images in the transparent area 310. In addition, small parts of the first backlight BL1 arrive at the transparent area 310 to cooperatively generate the images. As shown in FIG. 4D, when the display device is in the display mode, the light modulation panel 300 will display images in its entire area. The brightness level of the image is uniformly distributed and the probability of dark areas formed on the transparent areas 310 is decreased.

Through the above design of having parts of the first backlight BL1 arrive at the transparent area 310, when the display device is in the transparent mode, the first backlight module 100 can provide supplementary lighting to the displayed object 800 in order to increase the clarity levels when viewing from outside of the device. When in the display mode, the second backlight module 200 can provide the second backlight BL2 to be a supplemental light to the transparent area 310. In this manner, the lack of light from the first backlight BL1 being blocked can be compensated to maintain the light uniformity of the entire displayed image. In the embodiment, the average light-emittance angle (light viewing angle) of the first backlight BL1 is greater than the light-emittance angle of the second backlight BL2. The average light-emittance angle preferably can be represented by the light-emitting angle range corresponding to the FWHM (full width at half maximum) of the spectral distribution of luminous intensity. Since the average light-emittance angle (viewable angle) of the first backlight BL1 is different from the light-emittance angle of the second backlight BL2, this difference in light-emitting angle allows the first backlight BL1 to perform a slightly different role to the second backlight BL2. That is, since the first backlight BL1 has a greater average light-emittance angle, the first backlight BL1 can have better supplementary lighting effects on the displayed object 800; whereas the second backlight BL2 provides better lighting effects to compensate on the transparent area 310.

Figure 5:
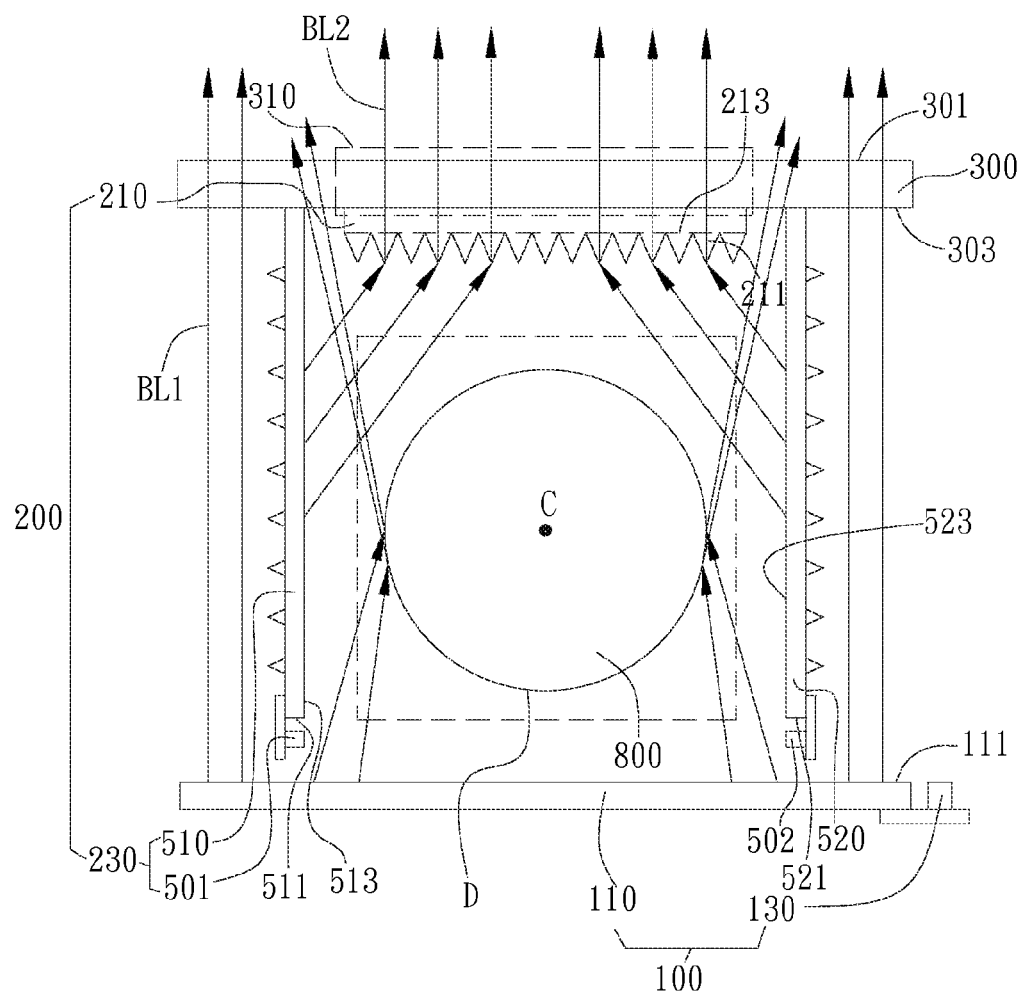
FIG. 5 is an illustration of another embodiment of the collimated backlight source.

As shown in another embodiment in FIG. 5, the collimated backlight source 230 further includes a second light-guide plate 520 and a second light source 502, wherein the second light-guide plate 520 and the second light source 502 disposed symmetrically to the first light-guide plate 510 and the first light source 501. The second light-guide plate 520 is vertically disposed between the light modulation panel 300 and the first backlight module 100, and has a second light-entrance end 521 and a second light-emitting surface 523. The second light-emitting surface 523 is a surface of the second light-guide plate 520 facing the columnar (rectangular) space D, which the displayed object 800 is accommodated in. The second light-entrance end 521 is positioned on an end of the second light-emitting surface 523 away from the prism sheet 210. The second light-emitting surface 523 and the first light-emitting surface 513 are opposite and substantially parallel to each other, wherein the first light-emitting surface 123 and the second light-emitting surface 523 are substantially orthogonal to the light-emitting surface 111 of the first backlight module 100; however, the present embodiment is not restricted to the first light-emitting surface 513 and the second light-emitting surface 523 being substantially orthogonal to the light-emitting surface 111 of the first backlight module 100. In other different embodiments, the respective angles of the first light-emitting surface 513 and the second light-emitting surface 523 to the light-emitting surface 111 may be adjusted according to design requirements of their respective light-guide plates. For instance, the first light-emitting surface 513 and the second light-emitting surface 523 may be adjusted to be +/−10 degrees from being orthogonal to the light-emitting surface 111. In the present embodiment, The second light source 502 is disposed corresponding to the second light-entrance end 521 and generates light entering the second light-guide plate 520 through the second light-entrance end 521. The second light-guide plate 520 emits the light in a planar light form out the second light-emitting surface 523 at an inclined angle with respect to the second light-emitting surface 523, wherein the light then arrives at the light-entrance surface 213 of the prism sheet 210. The prism sheet 210 deflects or redirects the light to form the second backlight BL2, wherein the second backlight BL2 then enters the transparent area 310. In the embodiment, the light from the second light source 502 and the first light source 501 can travel through the prism sheet 210, and provide better uniform lighting on the transparent area 310.

In addition, in the present embodiment, the first light source 501 and the second light source 502 simultaneously light up to provide better uniform light. However, in other different embodiments, the first light source 501 and the second light source 502 light up in alternating fashion such that light generated from the two would respectively arrive at the prism sheet 210 at different times. Three-dimensional display can be achieved in coordination with the light dispersal design of the prisms 211 on the prism sheet 210.

Figure 6A:
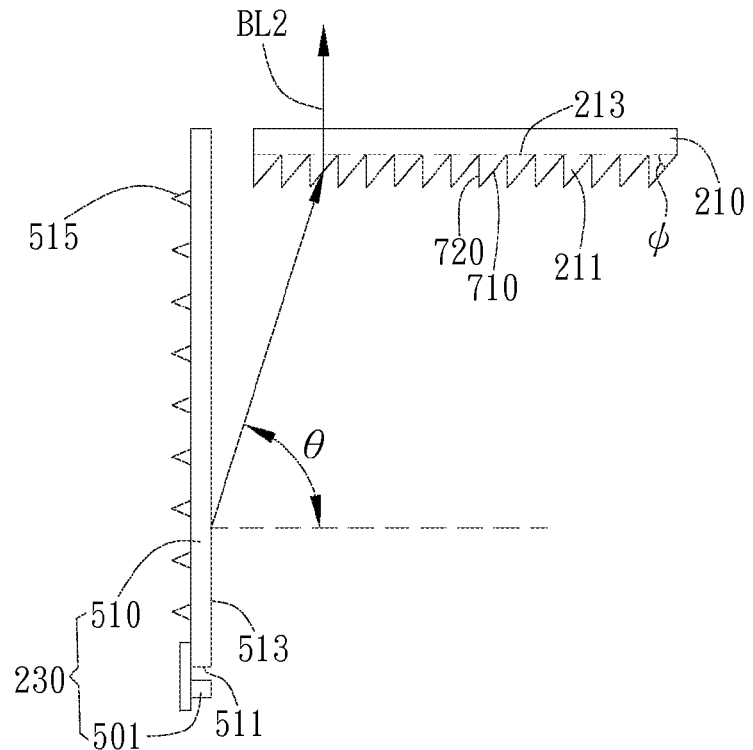
FIG. 6A is a cross-sectional view of an embodiment of the prism sheet.

As shown in FIG. 6A, the prisms 211 on the prism sheet 210 include a first prism surface 710 and a second prism surface 720. The first prism surface 710 faces away from light generated by the collimated backlight source, and the second prism surface 720 faces light generated by the collimated backlight source. The first prism surface 710 and the second prism surface 720 are disposed asymmetrically, wherein the angle between the second prism surface 720 and the normal direction of the light-entrance surface 213 is greater than the angle between the first prism surface 710 and the normal direction of the light-entrance surface 213. For instance, the second prism surface 720 can be perpendicular to the light-entrance surface 213. By way of this design, the first prism surface 710 can receive a greater ratio of light to increase light (use) efficiency. In addition, an average emitting angle ∂ of the light emitting from the first light-emitting surface 513 is between 50 degrees and 80 degrees and the angle between the first prism surface 710 and the light-entrance surface 213 is preferably smaller than 50 degrees, and it results to generate better light redirecting effects. The angle between the first prism surface 710 and the light-entrance surface 213 mentioned here refers to the angle within the prism 211 between the first prism surface 710 and the light-entrance surface 213. In order to control the inclined light-emitting angle of light emitting from the first light-emitting surface 513, the angle of the light-extracting microstructures 515 on the bottom surface of the first light-guide plate 510 is suitably adjusted and set. The light-extracting microstructures 515 closer to and further away from the first light-emitting end 511 have different light-emitting angles. In this manner, light at positions closer to and further away from the first light-emitting end 511 will respectively have different light-emitting angles such that they arrive at different positions on the prism sheet 210.

Figure 6B:
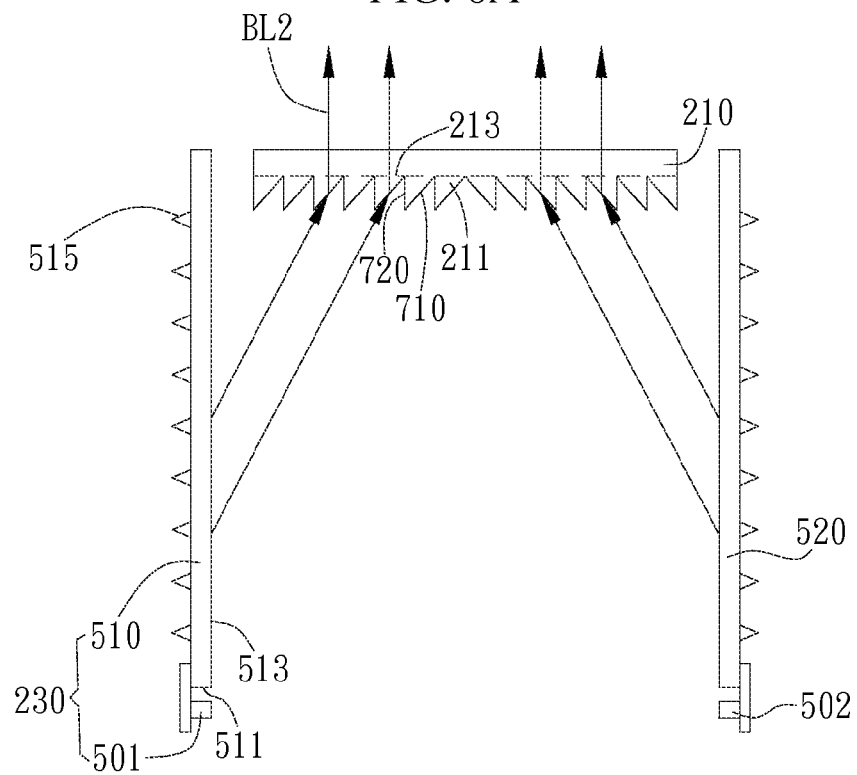
FIG. 6B is a cross-sectional view of another embodiment of the prism sheet.

As shown in the embodiment in FIG. 6B, the first light-guide plate 510 and the second light-guide plate 520 of the collimated backlight source 230 are respectively disposed two different ends of the prism sheet 210. In the present embodiment, the distribution of the prisms 211 are symmetrical to correspond to light emitting from the first light-guide plate 510 and the second light-guide plate 520. In other words, prisms 211 closer to the first light-guide plate 510 and prisms 211 closer to the second light-guide plate 520 are symmetrically opposite to each other in terms of their first prism surface 710 and second prism surface 720. In this manner, light emitting from the first light-guide plate 510 and the second light-guide plate 520 may be better redirected.

Figure 6C:
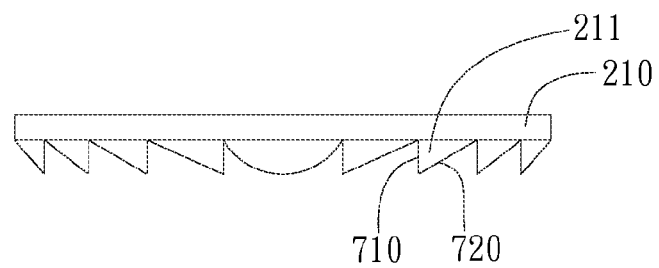
FIG. 6C is a cross-sectional view of another embodiment of the prism sheet.

In another different embodiment, the prism sheet 210 utilizes Fresnel lens. In the present embodiment, the prisms 211 are distributed in a concentric manner on the prism sheet 210. As shown in FIG. 6C, the angle between the first prism surface 710 and the second prism surface 720 gets larger for prisms 211 distributed closer to the center in order to correspondingly redirect light entering at greater angles. However, the present disclosure is not restricted to this configuration. In other different embodiments, other than the prisms 211 being arranged in a concentric manner, the prisms 211 are arranged in strips. By way of utilizing this in conjunction with the prisms 211 having asymmetrical design of the first prism surface 710 and the second prism surface 720 as above, the difference between the receivable amount of light on the same prism 211 from two sides can be increased. In addition, when the displayed object 800 is viewed through the transparent area 310 during the transparent mode, these types of prism sheet 210 can decrease blurred boundary conditions and allow the boundaries of the displayed object 800 to be visibly clear.

Figure 7:
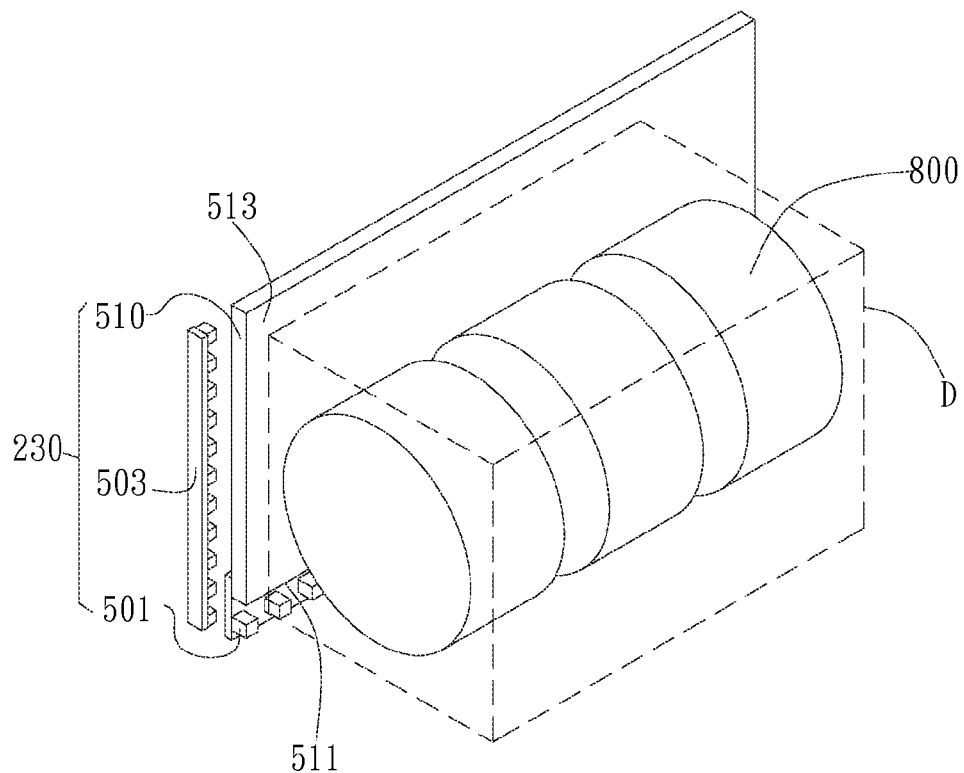
FIG. 7 is another embodiment of the collimated backlight source.

In another embodiment shown in FIG. 7, the collimated backlight source 230 additionally includes a first supplementary light source 503 disposed at another end of the first light-guide plate 510 different from the first light-entrance end 511. The end of the first light-guide plate 510 disposed with the first supplementary light source 503 is connected substantially perpendicular to the first light-entrance end 511. Since the first light-entrance end 511 is substantially perpendicular to the end disposed with the first supplementary light source 503, the direction of light generated by the first light source 501 is also substantially perpendicular to the direction of light generated by the first supplementary light source 503. Light generated by the first supplementary light source 503 enters the first light-guide plate 510, and then is light-guided to emit out of the first light-emitting surface 513 towards the columnar space D. When switched to the transparent mode, the lighting of the first supplementary light source 503 is controlled to supplement light for the displayed object 800. When switched to the display mode, the first supplementary light source 503 is controlled to be turned off. By way of this design, the visibility of the displayed object 800 when viewed through the transparent area 310 is increased during the transparent mode.

Although the embodiments of the present disclosure have been described herein, the above description is merely illustrative. Further modification of the invention herein disclosed will occur to those skilled in the respective arts and all such modifications are deemed to be within the scope of the invention as defined by the appended claims.

What is claimed is:

1. An electronic device having display capabilities, comprising:
    a light modulation panel having a backside and a transparent area;
    a first backlight module disposed with a gap to the backside and generating a first backlight entering the light modulation panel from the backside;
    a displayed object disposed between the transparent area and the first backlight module; and
    a second backlight module, comprising:
    a prism sheet disposed on the backside and corresponding to the transparent area, wherein the prism sheet is sandwiched between the transparent area and the displayed object; and
    a collimated backlight source disposed on a side of the displayed object, and two ends of the collimated backlight source respectively extend toward the prism sheet and the first backlight module, the collimated backlight source comprising:
    a first light-guide plate vertically disposed on a side of the displayed object and prism sheet, the first light-guide plate has a first light-entrance end and a first light-emitting surface, wherein the first light-emitting surface faces the displayed object, and the first light-entrance end is positioned at an end of the light-emitting surface away from the prism sheet;
    a second light-guide plate disposed on a side of the prism sheet corresponding to the first light-guide plate, the second light-guide plate is together with the first light-guide plate separately disposed at two sides of the displayed object, wherein the second light-guide plate has a second light-entrance end and a second light-emitting surface, the second light-emitting surface faces the displayed object, and the second light-entrance end is positioned on an end of the second light-emitting surface away from the prism sheet; and a second light source disposed corresponding to the second light-entrance end, wherein the second light source generates light entering the second light-entrance end to exit the second light-emitting surface at an incline towards the prism sheet after being light-guided by the second light-guide plate;

wherein the collimated backlight source generates light entering inclined into the light-entrance surface to form a second backlight that enters the transparent area after being deflected by the prism sheet.

2. The electronic device of claim 1, further comprising a control module, the control module can be signally connected respectively to the first backlight module and the second backlight module, and the control module can switch between a transparent mode and a display mode; when in the transparent mode, the control module only lights up the first backlight module and extinguishes the second backlight module; when in the display mode, the control module simultaneously lights the first backlight module and the second backlight module.

3. The electronic device of claim 1, wherein an average light viewing angle of the first backlight is greater than an average light viewing angle of the second backlight.

4. The electronic device of claim 1, wherein the displayed object is formed as a cylindrical shape, the prism sheet is parallel to the axis of the displayed object, and the collimated backlight source is disposed on a side of the axis.

5. The electronic device of claim 1, wherein the prism sheet comprises a plurality of prisms protruding on a light-entrance surface facing away from the light modulation panel.

* * * * *